United States Patent [19]
Taylor

[11] 3,880,836
[45] Apr. 29, 1975

[54] THIOCARBAMYLSULFENAMIDES
[75] Inventor: Ray D. Taylor, Brecksville, Ohio
[73] Assignee: The B. F. Goodrich Company, New York, N.Y.
[22] Filed: May 18, 1972
[21] Appl. No.: 254,531

[52] U.S. Cl. ... 260/239 BF; 260/79.5 P; 260/239 A; 260/239 E; 260/293.65; 260/293.85; 260/326.83; 260/551 R; 260/563 C; 260/563 P; 260/567; 260/583 NH
[51] Int. Cl..................... C07c 155/04; C07d 41/04
[58] Field of Search....... 260/326.83, 239 A, 239 E, 260/239 BF, 293.65, 567, 551 R

[56] References Cited
UNITED STATES PATENTS

| | | | |
|---|---|---|---|
| 2,333,468 | 11/1943 | Cooper | 260/567 |
| 2,424,921 | 7/1947 | Smith et al. | 260/567 |
| 2,692,862 | 10/1954 | Lipsitz | 260/567 |
| 3,686,214 | 8/1972 | Morita | 260/326.83 |

FOREIGN PATENTS OR APPLICATIONS
14,577   6/1969   Japan.................................. 260/306

OTHER PUBLICATIONS

Halasa, Defensive Publication of Serial No. T889,009, filed 7/70, laid open to public inspection on August 31, 1971, as noted at 889 O.G. 1363.
Samukawa et al., Chem. Abstracts, Vol. 72, Abstract No. 22461q (1970), QD1A51.

Primary Examiner—Alton D. Rollins
Attorney, Agent, or Firm—Alan A. Csontos

[57]    ABSTRACT

Novel thiocarbamylsulfenamides containing two secondary carbon atom configurations in the N'N' positions adjoining the sulfur atom nitrogen are useful as accelerators in the vulcanization of unsaturated polymers. The compounds are prepared by the reaction of an amine and a monohaloamine with carbon disulfide in the presence of a base.

1 Claim, No Drawings

THIOCARBAMYLSULFENAMIDES

BACKGROUND OF THE INVENTION

Many different species of thiocarbamylsulfenamides are known. Few of these compounds contain a secondary carbon atom configuration in the N' position adjoining the sulfur atom nitrogen. This is because there has been no practicable method of preparing such compounds.

SUMMARY OF THE INVENTION

The invention provides novel thiocarbamylsulfenamides containing two secondary carbon atom configurations in the N', N' positions adjoining the sulfur atom nitrogen.

DETAILED DESCRIPTION

The novel thiocarbamylsulfenamides have the formula

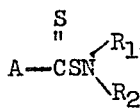

wherein A is selected from the group consisting of

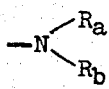   and   

where $R_a$ and $R_b$ are alkyl radicals containing 1 to 24 carbon atoms, R is hydrogen or an alkyl radical containing 1 to 4 carbon atoms, and $x = 2$ to 7; and $R_1$ and $R_2$ are selected from the group consisting of cycloalkyl radicals containing 4 to 8 carbon atoms in the ring and additionally can have 1 to 4 carbon atom alkyl substituents on the ring, a secondary carbon atom alkyl structure as

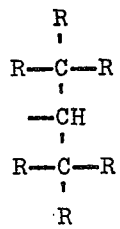

wherein R is defined as above and the total number of carbon atoms in the structure is at least five, and mixtures thereof.

Examples of such compounds are N,N-dimethyl-N',N'-di-(2-pentyl) thiocarbamylsulfenamide, N-methyl-N-ethyl-N',N'-dicyclohexyl thiocarbamylsulfenamide, N,N-dimethyl-N',N'-dicyclohexyl thiocarbamylsulfenamide, N,N-diethyl-N'-α-methylbutyl-N'-cyclohexyl thiocarbamylsulfenamide, N,N-diethyl-N',N'-dicyclohexyl thiocarbamylsulfenamide, N-methyl-N-hexyl-N',N'dicyclobutyl thiocarbamylsulfenamide, N,N-dihexyl-N',N'-dicyclohexyl thiocarbamylsulfenamide, N-hexyl-N-octyl-N'-α-methyloctyl-N'-cyclobutyl thiocarbamylsulfenamide, N,N-didodecyl-N',N'-dicyclohexyl thiocarbamylsulfenamide, N-dodecyl-N-octadecyl-N',N'-di(α-methylhexyl) thiocarbamylsulfenamide, N,N-ditetradecycl-N',N'-dicyclohexyl thiocarbamylsulfenamide, N,N-dioctadecyl-N',N'-dicyclohexyl thiocarbamylsulfenamide, N-tetramethylene-N',N'-di-(2-pentyl) thiocarbamylsulfenamide, N-pentamethylene-N',N'-dicyclopentyl thiocarbamylsulfenamide, N-hexamethylene-N',N'-di-α-ethylhexyl thiocarbamylsulfenamide, N-hexamethylene-N',N'-dicyclobutyl thiocarbamylsulfenamide, N-4-methylpentamethylene-N',N'-di(α-methyloctyl) thiocarbamylsulfenamide, N-pentamethylene-N'-α-methylbutyl-N'-cyclohexyl thiocarbamylsulfenamide, N-hexamethylene-N',N'-dicyclohexyl thiocarbamylsulfenamide and the like. More preferably when A is $-NR_aR_b$, $R_a$ and $R_b$ are alkyl radicals containing 1 to 18 carbon atoms such as methyl, ethyl, n-propyl, isopropyl, n-butyl, isobutyl, hexyl, octyl, 2-ethylhexyl, decyl, tetradecyl and the like; and when A is

$x = 3$ to 6 and R is hydrogen or a methyl or ethyl radical. A more preferred embodiment is that $R_1$ and $R_2$ are alike in the N',N' positions.

The novel thiocarbamylsulfenamides can be prepared in a process comprising the reaction of an amine of the formula H—A where A is

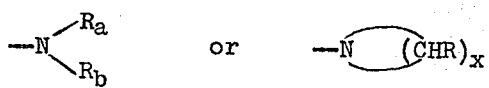

as defined above, a monohaloamine of the formula

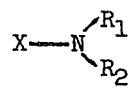

wherein X is selected from the class consisting of -Cl, -Br, and -I and $R_1$ and $R_2$ are defined as above, and carbon disulfide in the presence of a base.

Examples of the amines are dimethylamine, diethylamine, methylethylamine, diisopropylamine, dibutylamine, hexylmethylamine, dihexylamine, 2-ethylhexylmethylamine, dioctylamine, didodecylamine, tetradecylamine, dioctadecylamine, tetramethyleneamine, pentamethyleneamine, hexamethyleneamine, 4-methyl-pentamethyleneamine, and the like. More preferred, when A is

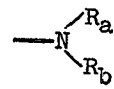

$R_a$ and $R_b$ are alkyl radicals containing 1 to 18 carbon atoms. Examples of such amines are dimethylamine, diethylamine, methylethylamine, diisopropylamine, dibutylamine, diisobutylamine, dihexylamine, dioctylamine, didecylamine, ditetradecylamine, and the like. When A is

more preferred are those amines where $x = 3$ to 6 and R is hydrogen or a methyl or ethyl radical. Examples of such amines are tetramethyleneamine, pentamethyleneamine, hexamethyleneamine, 4-methylpentamethyleneamine, 3,5-di-methylpentamethyleneamine, and the like. Equally good results are obtained when A is the alkyl amine structure or when it is the cyclic methyleneamine structure.

Examples of the monohaloamines are di-(2-pentyl)-chloroamine, di-(2-pentyl)-bromoamine, di-(α-methylhexyl)-chloroamine, di-(α-ethylhexyl)-iodoamine, di-(α-methyloctyl)-chloroamine, dicyclobutyl-chloroamine, 2-pentyl-cyclobutyl-bromoamine, dicyclopentyl-bromoamine, dicyclohexyl-iodoamine, dicyclohexyl-chloroamine, dicyclooctyl-chloroamine, and the like.

The monochloroamines are preferred. They are readily prepared by reacting a primary or secondary amine with a chlorinating agent such as sodium hypochlorite, NaOCl. This can be done in situ prior to the reaction of the chloro-amine with the thiocarbonate salt. Reference will be made to the monochloroamines as used in the process, though it is understood that monobromoamines and monoiodoamines may be used.

Examples of the monochloroamines are di-(2-pentyl)-chloroamine, di-(4-hexyl)-chloroamine, 2-pentyl-4-hexyl-chloroamine, α-methylhexyl-cyclobutyl-chloroamine, 2-pentyl-cyclohexyl-chloroamine, α-ethylhexyl-cyclooctyl-chloroamine, dicyclobutyl-chloroamine, dicyclopentyl-chloroamine, dicyclohexylchloroamine, dicyclooctyl-chloroamine, di-(4methyl-cyclohexyl)-chloroamine, and the like.

Equally good results are obtained when $R_1$ and $R_2$ are cycloalkyl radicals or when they are secondary carbon atoms alkyl structures. A more preferred embodiment is that $R_1$ and $R_2$ are alike on the monochloroamine.

When $R_1$ and $R_2$ are cycloalkyl radicals, cyclobutyl, cyclopentyl, and cyclohexyl would be more the preferred radicals. Each of these radicals may additionally have 1 or 2 carbon atom alkyl substituents thereon such as 3,5-dimethylcyclohexyl-chloroamine. When the $R_1$ and $R_2$ radicals are secondary carbon atom alkyl radicals, preferably R would be methyl or ethyl. Examples of the more preferred chloroamines would be di(2-pentyl)-chloroamine, di(4-hexyl)-chloroamine, dicyclobutyl-chloroamine, dicyclopentyl-chloroamine, dicyclohexyl-chloroamine, di-(3,5-dimethylcyclohexyl)chloroamine, and the like.

The base employed can be an alkali metal hydroxide such as sodium hydroxide and potassium hydroxide, an alkali metal alcoholate such as sodium methoxide and potassium butoxide, or the reaction product of a strong base and a weak acid such as sodium carbonate and sodium acetate. Excellent results were obtained when using an alkali metal hydroxide such as sodium hydroxide as the base. The reaction can be conducted as a slurry in water. The amine is more or less soluble in water, depending on the $R_a$ and $R_b$ radicals. The chloroamine, the carbon disulfide and the base are added to the amine/water and the mixture agitated. The chloroamine, the carbon disulfide, and the thiocarbamylsulfenamide product are insoluble in water. When agitation is stopped, the mixture separates and the organic product phase is separated out. The thiocarbamylsulfenamide can be isolated by evaporating off the little unreacted chloroamine and carbon disulfide under reduced pressure.

A more preferred process is to conduct the reaction in an aqueous/non-aqueous medium. In this manner, higher yields and more pure products can be obtained. The medium consists of water and an organic solvent, preferably a chlorinated organic solvent such as carbon tetrachloride, chloroform, ethylene dichloride, 1,1,2-trichloroethane, and the like. The monochloroamine, the carbon disulfide, and the dithiocarbamylsulfenamide are all soluble in the non-aqueous phase.

The temperature of the reaction ranges from near the freezing point of the mixture, about −20°C., to near the boiling point of the mixture, about 80°–100°C. A more preferred range is from about −10°C. to about 40°C. Reaction times are from about 0.2 hour to about 2 hours.

The amine and the monochloroamine can both be used in a molar excess of the amount of the carbon disulfide present. However, yields after purification of over 40 percent and in excess of 70 percent based on the theoretical yield are readily obtained using essentially one mol of monochloroamine and one mol of amine to every one mol of carbon disulfide present. The reaction is conducted with agitation. After the reaction, the mixture is allowed to separate and the non-aqueous phase is decanted off and dried down to isolate the product. The novel thiocarbamylsulfenamides are normally crystalline materials at room temperatures. The product can be purified by dissolving it in an alcohol such as methanol and ethanol or in an alkane such as hexane, and then precipitating it out by cooling. The compounds can be characterized by melting point, infra-red (IR) spectra, nuclear magnetic resonance (NMR), and carbon/hydrogen/nitrogen analysis.

The novel thiocarbamylsulfenamides have particular utility as accelerators in the vulcanization of unsaturated polymers. Examples of such polymers are natural rubber; diene rubbers such as polybutadiene, polyisoprene, and the like; ethylene-propylene-diene polymers where the diene is 1,4-hexadiene, dicyclopentadiene, ethylidene norbornene, and the like; diene/styrene polymers and diene/acrylonitrile polymers; and like polymers that have carbon-carbon unsaturation and are capable of being crosslinked with sulfur. The novel compounds have excellent shelf stability compared to that of thiocarbamylsulfenamides in general.

The compounds are normally used in combination with a vulcanizing agent such as sulfur or a primary sulfur donor such as the thiuram disulfides. They can be added to the polymer using internal mixers such as banburys or using two-roll mills and the like. The compounds are used in levels from about 0.05 part to about 7 parts by weight based upon 100 parts by weight of the polymer, and more preferably from about 0.3 part to about 5 parts by weight.

The polymers typically contain other ingredients which are added in a manner similar as the curing agents. These ingredients are fillers such as carbon blacks, clays, silicas, carbonates, and the like; lubricants and plasticizers; antioxidants and stabilizers; and the like.

The following examples serve to more fully illustrate the invention.

EXAMPLE I

N,N-dimethyl-N',N'-dicyclohexyl-thiocarbamylsulfenamide was prepared. 100 milliliters of carbon tetrachloride, 39.6 grams of a solution of dimethylamine at 25 percent by weight in water (0.22 mol), and 36.2 grams (0.2 mol) of dicyclohexylamine were placed in a reactor vessel and the mixture cooled to 10°C. 114 milliliters of a solution of NaOCl at 14 percent by weight in water (0.23 mol) was added and the mixture stirred for 15 minutes at 10°–15°C. About 0.2 mol of NaOH was formed as a by-product.

200 milliliters of water containing 25 grams of NaHCO$_3$ and 11 grams of Na$_2$CO$_3$ was added as a buffer solution. The mixture was then warmed to 20°C. and 15.2 grams (0.2 mol) of carbon disulfide was added with stirring. The mixture was maintained at 32°–35°C. for 40 minutes while being agitated. After settling, the nonaqueous phase was separated out and filtered. The CCl$_4$ was evaporated off by heating under reduced pressure and 61 grams of a thick liquid was obtained. This liquid was added to 150 milliliters of methanol and a solid precipitated out. The methanol slurry was cooled to −10°C. and filtered. The recovered solid was a white crystalline material having a melting point of 80°–82°C. The amount obtained was 44.1 grams, indicating a yield of 77 percent of theoretical. The N,N-dimethyl-N',N'-dicyclohexyl thiocarbamylsulfenamide was identified through its IR spectrum. The calculated element weights for the formula $C_{15}H_{28}N_2S_2$ were 9.32 percent N, 60.0 percent C, and 9.32 percent H. Analytical test results were 9.34 percent N, 59.8 percent C, and 9.60 percent H.

When using diethylamine, dihexylamine and didodecylamine respectively, in place of dimethylamine, the compounds prepared are N,N-diethyl-N',N'-dicyclohexyl thiocarbamylsulfenamide, N,N-dihexyl-N',N'-dicyclohexyl thiocarbamylsulfenamide, and N,N-didodecyl-N',N'-dicyclohexyl thiocarbamylsulfenamide.

EXAMPLE II

Using the procedure given in Example I, N-hexamethylene-N',N'-dicyclohexyl thiocarbamylsulfenamide was prepared by the reaction of hexamethyleneamine and dicyclohexylamine chloride with carbon disulfide in the presence of NaOH. The yield of the material after purification was 40 percent by weight of theoretical. The product had a melting point of 88°–89°C. When using dicyclobutylamine in place of dicyclohexylamine, the product is N-hexamethylene-N',N'-dicyclobutyl thiocarbamylsulfenamide.

EXAMPLE III

The N,N-dimethyl-N',N'-dicyclohexyl thiocarbamylsulfenamide prepared in Example I was evaluated as an accelerator in the sulfur cure of an ethylene-propylene-diene polymer. The polymer employed had a composition of about 60 percent by weight of ethylene, about 36 percent by weight of propylene, and about 4 percent by weight of 5-ethylidene-2-norbornene, and a raw polymer Mooney of about 80. The recipe used (in parts by weight) and the tensile properties were as follows:

| | |
|---|---|
| EPDM rubber | 100 |
| N220 black | 80 |
| Oil[1] | 55 |
| ZnO | 5 |
| Stearic acid | 1 |
| Sulfur | 1.5 |
| Accelerator | 1.5 |
| Tensile, psig | 2410 |
| 300% Modulus, psig | 1340 |
| Elongation, percent | 500 |

[1]-naphthenic processing oil, 18% by weight aromatics content

The ingredients were incorporated into the polymer using a banbury for the carbon black, oil, ZnO, and stearic acid and a two-roll mill for the sulfur and accelerator. The compound was then sheeted off, cut, and press-cured for 17 minutes at 320°F. Tensile, modulus, and elongation were determined following ASTM procedure D412. The example shows that the novel thiocarbamylsulfenamide is an efficient accelerator for EPDM rubber.

EXAMPLE IV

The compound, N,N-dimethyl-N',N'-dicyclohexyl thiocarbamylsulfenamide, used in Example III and N-hexamethylene-N',N'-dicyclohexyl thiocarbamylsulfenamide, prepared in Example II, were evaluated as accelerators in the sulfur cure of a styrene-butadiene polymer. The SBR used was a SBR 1502 rubber, composed of about 23.5 percent styrene and 76.5 percent 1,3-butadiene. The recipes used (in parts by weight) and the tensile properties were as follows:

| | 1 | 2 |
|---|---|---|
| SBR 1502 | 100 | 100 |
| HAF black | 50 | 50 |
| ZnO | 5 | 5 |
| Stearic acid | 3 | 3 |
| Sulfur | 2 | 2 |
| Accelerator 1[1] | 1.0 | — |
| Accelerator 2[2] | — | 1.0 |
| Tensile, psig | 3490 | 3780 |
| 300% Modulus, psig | 3290 | 3420 |
| Elongation, percent | 310 | 330 |

[1]-N,N-dimethyl-N',N'-dicyclohexyl thiocarbamylsulfenamide
[2]-N-hexamethylene-N',N'-dicyclohexyl thiocarbamylsulfenamide The ingredients were incorporated into the rubber using a banbury for the carbon black, ZnO, and stearic acid and a two-roll mill for the sulfur and accelerator. The compounds were sheeted off, cut and press-cured for 25 minutes at 302°F. Similar results were obtained when the thiocarbamylsulfenamide contained secondary carbon atom structures in the N',N' positions. The Example demonstrates that the novel thiocarbamylsulfenamides of this invention have utility as accelerators in the cure of unsaturated polymers.

I claim:

1. The compound, N-hexamethylene-N',N'-dicyclohexyl thiocarbamylsulfenamide.

\* \* \* \* \*